US012613530B2

(12) United States Patent
Iwahori et al.

(10) Patent No.: US 12,613,530 B2
(45) Date of Patent: Apr. 28, 2026

(54) REMOTE CONTROL SYSTEM, CONTROLLER, AND REMOTE CONTROL METHOD

(71) Applicant: TOYOTA JIDOSHA KABUSHIKI KAISHA, Toyota (JP)

(72) Inventors: Kento Iwahori, Nagoya (JP); Shogo Yasuyama, Okazaki (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 18/626,709

(22) Filed: Apr. 4, 2024

(65) Prior Publication Data

US 2024/0361774 A1 Oct. 31, 2024

(30) Foreign Application Priority Data

Apr. 28, 2023 (JP) ................................. 2023-074214

(51) Int. Cl.
*G05D 1/227* (2024.01)
(52) U.S. Cl.
CPC ................................. *G05D 1/2272* (2024.01)
(58) Field of Classification Search
CPC ............................. G05D 1/227; G05D 1/2272
See application file for complete search history.

(56) References Cited

U.S. PATENT DOCUMENTS

2017/0320529 A1    11/2017  Nordbruch
2021/0026347 A1 *   1/2021  Nakashima ........... G05D 1/0016
2022/0150708 A1 *   5/2022  White .................... H04W 12/63
2022/0356052 A1 *  11/2022  Kim ..................... B66F 9/07581

FOREIGN PATENT DOCUMENTS

JP       2017-538619 A    12/2017
JP        2021-43559 A     3/2021

* cited by examiner

*Primary Examiner* — Aaron L Troost
(74) *Attorney, Agent, or Firm* — Oliff PLC

(57) ABSTRACT

A remote control system includes a moving object including command accepting and first communication units. The command accepting unit is switchable between valid and invalid states. The valid state accepts a remote control command supplied from outside the moving object. The invalid state rejects the remote control command. The first communication unit transmits at least one information of first and second information. The first information indicates a sign that the operating state will switch to the valid state. The second information indicates that the operating state has switched to the valid state. A controller includes second communication and judging units. The second communication unit receives the at least one information. The judging unit permits switching of the operating state to the valid state when the judging unit judges that the second communication unit has received the at least one information and a predetermined permission condition is satisfied.

9 Claims, 10 Drawing Sheets

Figure 1:
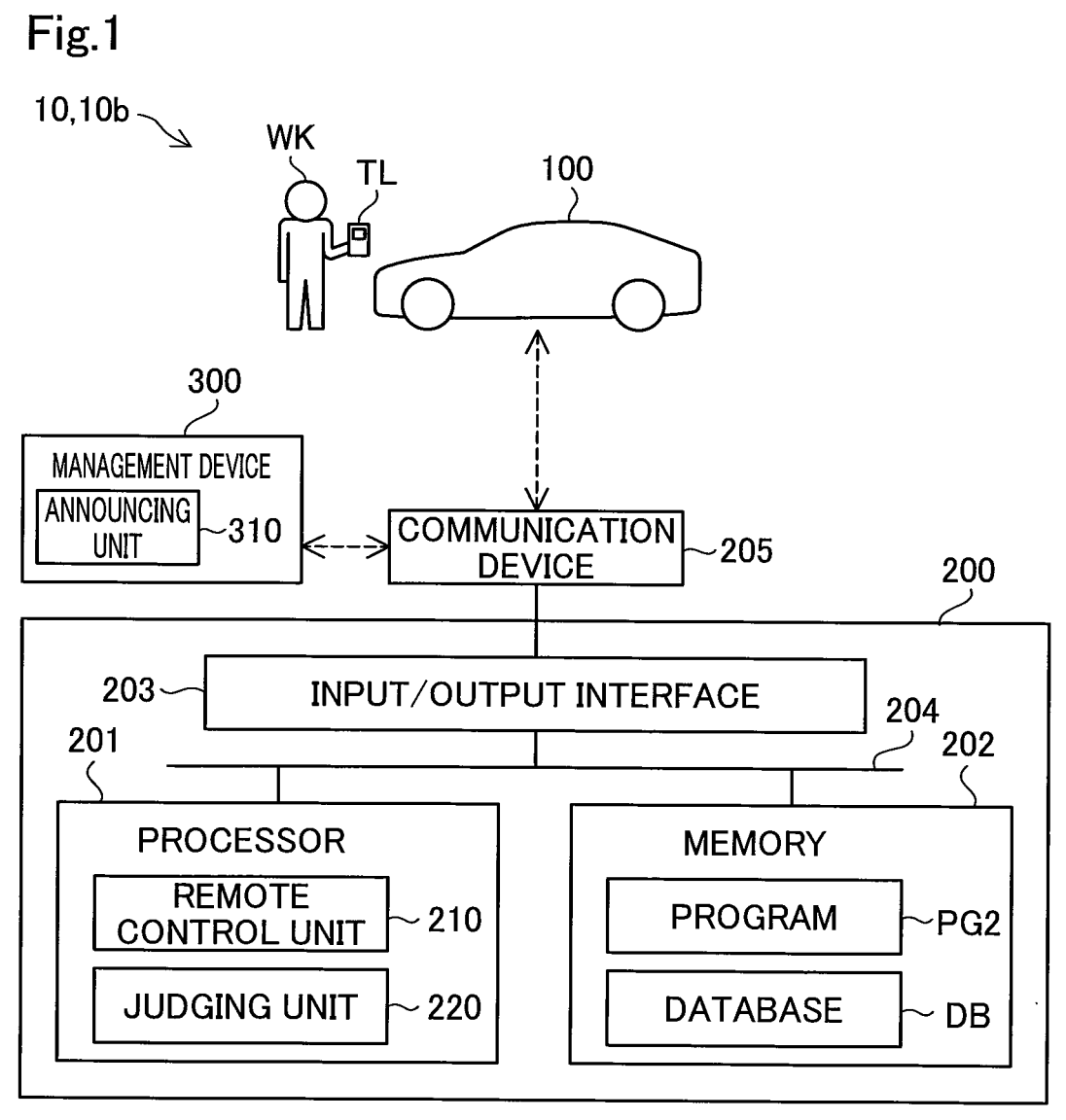

| MANAGEMENT DEVICE |
| --- |
| ANNOUNCING UNIT ~310 |

COMMUNICATION DEVICE ~205

200

203~ INPUT/OUTPUT INTERFACE   204   202

201

| PROCESSOR |
| --- |
| REMOTE CONTROL UNIT ~210 |
| JUDGING UNIT ~220 |

| MEMORY |
| --- |
| PROGRAM ~PG2 |
| DATABASE ~DB |

Fig.4B

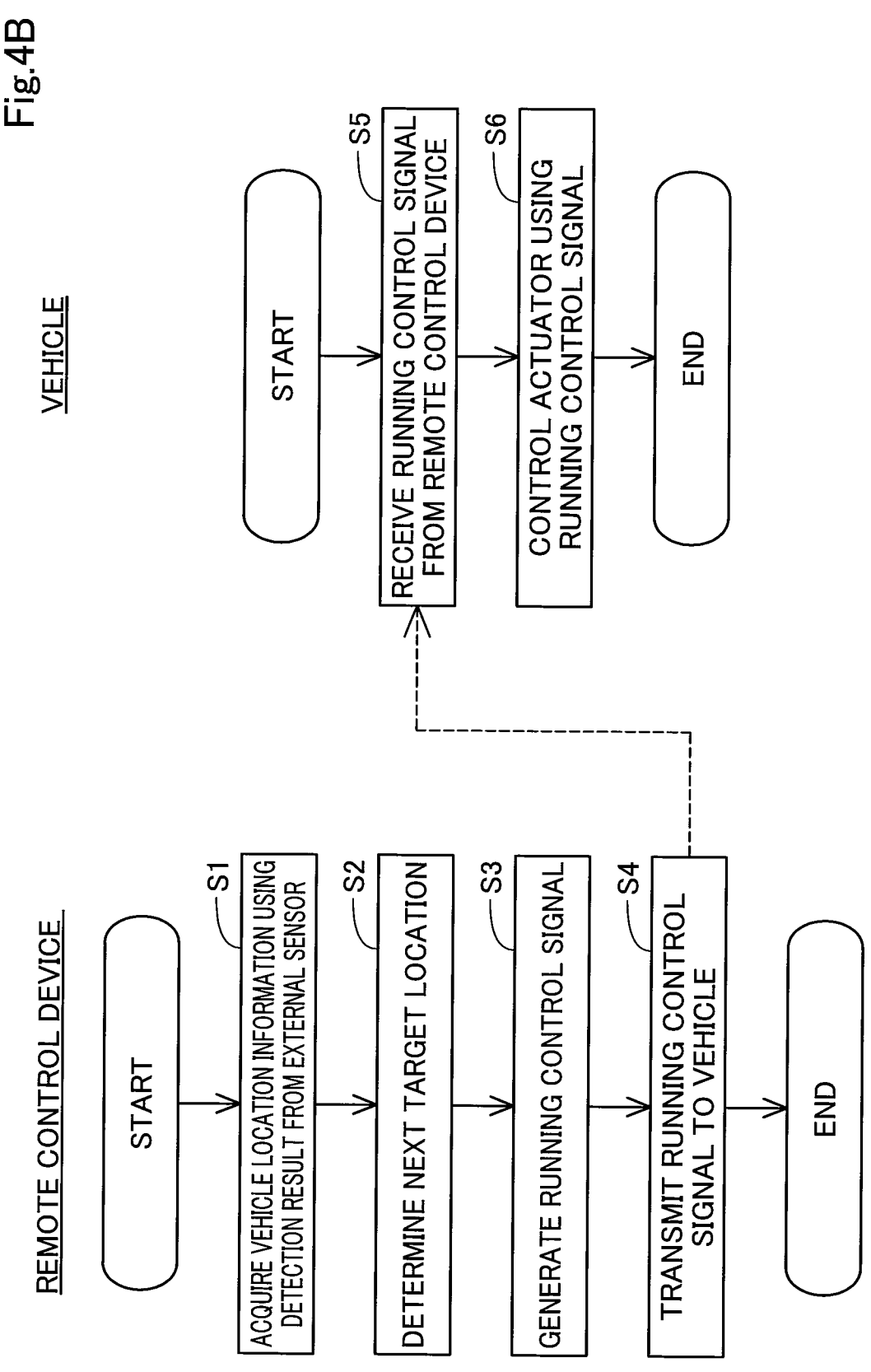

REMOTE CONTROL DEVICE

START

S1 — ACQUIRE VEHICLE LOCATION INFORMATION USING DETECTION RESULT FROM EXTERNAL SENSOR

S2 — DETERMINE NEXT TARGET LOCATION

S3 — GENERATE RUNNING CONTROL SIGNAL

S4 — TRANSMIT RUNNING CONTROL SIGNAL TO VEHICLE

END

VEHICLE

START

S5 — RECEIVE RUNNING CONTROL SIGNAL FROM REMOTE CONTROL DEVICE

S6 — CONTROL ACTUATOR USING RUNNING CONTROL SIGNAL

END

REMOTE CONTROL SYSTEM, CONTROLLER, AND REMOTE CONTROL METHOD

CROSS REFERENCE TO RELATED APPLICATIONS

This application claims priority to Japanese Patent Application No. 2023-074214, filed Apr. 28, 2023, the disclosure of which is incorporated by reference herein in its entirety.

BACKGROUND

Field

The present disclosure relates to a remote control system, a controller, and a remote control method.

There is a known technique that causes a vehicle to run by remote control in a step of manufacturing the vehicle (for example, Japanese Patent Application Publication (Translation of PCT Application) No. 2017-538619).

To improve convenience for a user, it is preferable that validation and invalidation of remote control over a moving object be switchable. However, if switching from invalidation to validation of remote control is unconditionally possible, the remote control may be implemented in an improper situation.

SUMMARY

The present disclosure is feasible in the following aspects.

(1) According to a first aspect of the present disclosure, a remote control system is provided. The remote control system comprises: a moving object configured to be operatable by remote control, the moving object including a command accepting unit and a first communication unit, the command accepting unit having a valid state and an invalid state as operating states, the command accepting unit configured to be switchable between the valid state and the invalid state, the valid state being the operating state that accepts a remote control command supplied from outside the moving object, the invalid state being the operating state that rejects the remote control command, the first communication unit configured to transmit at least one information of first information and second information, the first information being information indicating a sign that the operating state will be switched to the valid state, the second information being information indicating that the operating state has been switched to the valid state; and a controller including a second communication unit and a judging unit, the second communication unit configured to receive the at least one information, the judging unit configured to permit switching of the operating state to the valid state when the judging unit judges that the second communication unit has received the at least one information and a predetermined permission condition is satisfied.

The remote control system of this aspect makes it possible to reduce a likelihood that remote control over the moving object will be implemented in an improper situation.

(2) In the remote control system of the above-described aspect, when the judging unit judges that the second communication unit has received the first information and the permission condition is satisfied, the judging unit may transmit a permission notification indicating permission of switching of the operating state to the valid state to the moving object, and when the permission notification has not been received within a predetermined period since transmission of the first information from the first communication unit, the command accepting unit may limit switching of the operating state to the valid state.

The remote control system of this aspect allows switching of the operating state of the command accepting unit from the invalid state to the valid state to be limited if the permission condition is not satisfied. Thus, it is possible to reduce a likelihood that remote control over the moving object will be implemented in an improper situation.

(3) In the remote control system of the above-described aspect, when the judging unit judges that the second communication unit has received the second information and the permission condition is not satisfied, the judging unit may transmit an invalidation command for making switching of the operating state to the invalid state to the moving object.

The remote control system of this aspect allows the operating state of the command accepting unit to be set again from the valid state to the invalid state if the permission condition is not satisfied. Thus, it is possible to reduce a likelihood that remote control over the moving object will be implemented in an improper situation.

(4) In the remote control system of the above-described aspect, when the switching of the operating state to the invalid state in response to the invalidation command is successful, the command accepting unit may transmit an invalidation success notification to the controller, the invalidation success notification may be a notification indicating that invalidation has been implemented successfully, and when the judging unit has not receive the invalidation success notification within a predetermined period after transmitting the invalidation command to the moving object, the judging unit may transmit a stop command for limiting movement of the moving object to the moving object.

The remote control system of this aspect allows movement of the moving object to be limited if the operating state of the command accepting unit is not set again from the valid state to the invalid state. Thus, it is possible to reduce a likelihood that remote control over the moving object will be implemented in an improper situation.

(5) The remote control system of the above-described aspect may further comprise an announcing unit configured to announce that abnormality has occurred.

When the switching of the operating state to the invalid state in response to the invalidation command is successful, the command accepting unit may transmit an invalidation success notification to the controller, the invalidation success notification may be a notification indicating that invalidation has been implemented successfully, and when the judging unit has not receive the invalidation success notification within a predetermined period after transmitting the invalidation command to the moving object, the judging unit may make the announcing unit announce that abnormality has occurred.

The remote control system of this aspect makes it possible to announce that the abnormality has occurred if the operating state of the command accepting unit is not set again from the valid state to the invalid state.

(6) In the remote control system of the above-described aspect, the permission condition may include a condition that the moving object is stopping.

The remote control system of this aspect makes it possible to improve safety while remote control over the moving object is validated.

(7) In the remote control system of the above-described aspect, the permission condition may include a condition that switching of the operating state to the valid state is made by a predetermined device.

The remote control system of this aspect makes it possible to reduce a likelihood that remote control over the moving object will be implemented after the operating state of the command accepting unit is switched to the valid state by an unpermitted device.

(8) In the remote control system of the above-described aspect, the permission condition may include a condition that switching of the operating state to the valid state is made at a predetermined place.

The remote control system of this aspect makes it possible to reduce a likelihood that remote control over the moving object will be implemented after the operating state of the command accepting unit is switched to the valid state at an unpermitted place.

(9) In the remote control system of the above-described aspect, the permission condition may include a condition that switching of the operating state to the valid state is made by a predetermined person.

The remote control system of this aspect makes it possible to reduce a likelihood that remote control over the moving object will be implemented after the operating state of the command accepting unit is switched to the valid state by an unpermitted person.

(10) According to a second aspect of the present disclosure, a moving object configured to be operatable by remote control is provided. The moving object comprises: a command accepting unit having a valid state and an invalid state as operating states, the command accepting unit configured to be switchable between the valid state and the invalid state, the valid state being the operating state that accepts a remote control command supplied from outside the moving object, the invalid state being the operating state that rejects the remote control command; and a communication unit configured to transmit at least one information of first information and second information, the first information being information indicating a sign that the operating state will be switched to the valid state, the second information being information indicating that the operating state has been switched to the valid state.

The moving object of this aspect makes it possible to reduce a likelihood that remote control over the moving object will be implemented in an improper situation.

(11) According to a third aspect of the present disclosure, a controller is provided. The controller comprises: a communication unit configured to receive at least one information of first information and second information from a moving object, the moving object configured to be operatable by remote control, the moving object including a command accepting unit having a valid state and an invalid state as operating states, the command accepting unit configured to be switchable between the valid state and the invalid state, the valid state being the operating state that accepts a remote control command supplied from outside the moving object, the invalid state being the operating state that rejects the remote control command, the first information being information indicating a sign that the operating state will be switched to the valid state, the second information being information indicating that the operating state has been switched to the valid state; and a judging unit configured to permit switching of the operating state to the valid state when the judging unit judges that the communication unit has received the at least one information and a predetermined permission condition is satisfied.

The controller of this aspect makes it possible to reduce a likelihood that remote control over the moving object will be implemented in an improper situation.

(12) According to a fourth aspect of the present disclosure, a remote control method is provided. The remote control method comprises: receiving at least one information of first information and second information from a moving object, the moving object configured to be operatable by remote control, the moving object including a command accepting unit having a valid state and an invalid state as operating states, the command accepting unit configured to be switchable between the valid state and the invalid state, the valid state being the operating state that accepts a remote control command supplied from outside the moving object, the invalid state being the operating state that rejects the remote control command, the first information being information indicating a sign that the operating state will be switched to the valid state, the second information being information indicating that the operating state has been switched to the valid state; judging whether the at least one information has been received and whether a predetermined permission condition is satisfied; and permitting switching of the operating state to the valid state when the judging judges the at least one information has been received and the predetermined permission condition is satisfied.

The remote control method of this aspect makes it possible to reduce a likelihood that remote control over the moving object will be implemented in an improper situation.

The present disclosure is feasible in various aspects other than the remote control system, the moving object, the controller, and the remote control method. For example, the present disclosure is feasible in aspects including a computer program and a recording medium storing the computer program.

BRIEF DESCRIPTION OF THE DRAWINGS

FIG. 1 is an explanatory view showing the configuration of a remote control system;

FIG. 4B is a flowchart showing a procedure of running control over the vehicle;

DETAILED DESCRIPTION

A. First Embodiment

Figure 2:
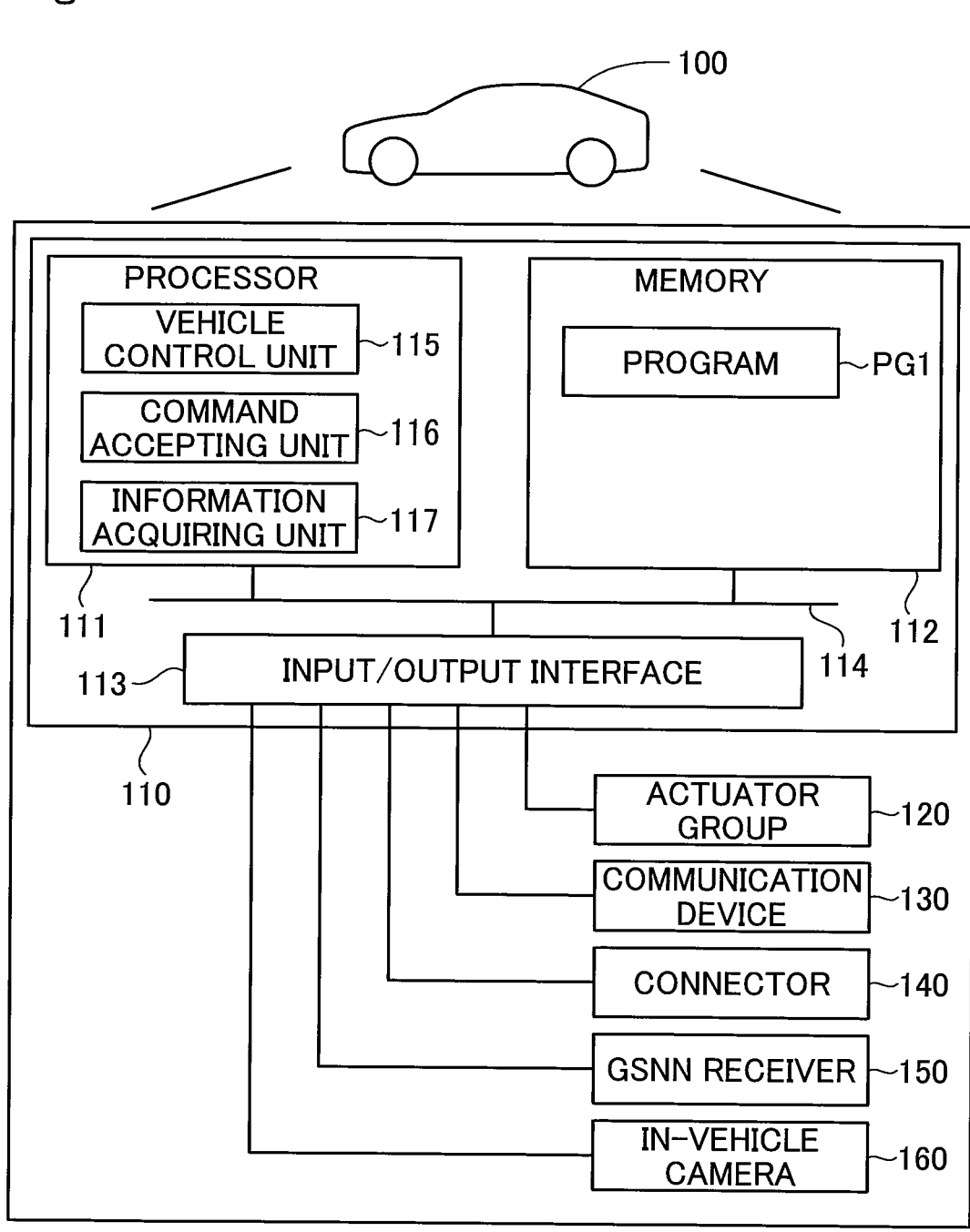
FIG. 2 is an explanatory view showing the configuration of a vehicle.

FIG. 1 is an explanatory view showing the configuration of a remote control system 10 according to a first embodiment. FIG. 2 is an explanatory view showing the configuration of a vehicle 100 according to the first embodiment. The remote control system 10 is used for controlling a moving object remotely.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

As shown in FIG. 1, in the present embodiment, the remote control system 10 includes the vehicle 100 remotely controllable, a remote controller 200 for controlling the vehicle 100 remotely, and a management device 300. The remote controller 200 may be called a controller simply.

As shown in FIG. 2, the vehicle 100 includes a vehicle controller 110 for controlling each unit of the vehicle 100, an actuator group 120 to be driven under control by the vehicle controller 110, a communication device 130 for communicating with the remote controller 200 via radio communication, a connector 140 to which a switcher TL for switching between validation and invalidation of remote control over the vehicle 100 is to be connected, a global navigation satellite system (GSNN) receiver 150 for acquiring location information about the vehicle 100, and an in-vehicle camera 160 for capturing an image of the interior of the vehicle 100. In the present embodiment, the actuator group 120 includes an actuator of a driving device for accelerating the vehicle 100, an actuator of a steering device for changing a traveling direction of the vehicle 100, and an actuator of a braking device for decelerating the vehicle 100. The driving device includes a battery, a motor for running to be driven by power from the battery, and a drive wheel to be rotated by the motor for running. The actuator of the driving device includes the motor for running. The connector 140 is arranged in the interior of the vehicle 100. The in-vehicle camera 160 is usable for capturing an image showing a situation where the switcher TL is being connected to the connector 140 by a worker WK. The communication device 130 may be called a first communication unit.

The vehicle controller 110 is configured using a computer including a processor 111, a memory 112, an input/output interface 113, and an internal bus 114. The processor 111, the memory 112, and the input/output interface 113 are connected to each other via the internal bus 114 in a manner allowing bidirectional communication therebetween. The actuator group 120, the communication device 130, the connector 140, the GSNN receiver 150, and the in-vehicle camera 160 are connected to the input/output interface 113. The memory 112 stores a computer program PG1.

The processor 111 executes the computer program PG1 to function as a vehicle control unit 115, a command accepting unit 116, and an information acquiring unit 117. The vehicle control unit 115 controls the actuator group 120. The command accepting unit 116 accepts a remote control command supplied from outside the vehicle 100. The remote control command is a control command for driving the actuator group 120. In the present embodiment, the remote control command indicates a target value of an acceleration or a target value of a steering angle of the vehicle 100, for example. The remote control command may indicate a target route of the vehicle 100. In this case, the vehicle control unit 115 may determine a target value of an acceleration or a target value of a steering angle of the vehicle 100 on the basis of the target route. The remote control command accepted by the command accepting unit 116 is supplied to the vehicle control unit 115. With a driver on board the vehicle 100, the vehicle control unit 115 is capable of causing the vehicle 100 to run by controlling the actuator group 120 in response to operation by the driver. The vehicle control unit 115 is also capable of causing the vehicle 100 to run by controlling the actuator group 120 in response to the remote control command accepted by the command accepting unit 116 independently of whether the driver is on board the vehicle 100.

The command accepting unit 116 is capable of switching an operating state of the command accepting unit 116 itself between a valid state where a remote control command is accepted and an invalid state where the remote control command is not accepted. In the following description, switching the operating state of the command accepting unit 116 from the invalid state to the valid state is called validating remote control, and switching the operating state of the command accepting unit 116 from the valid state to the invalid state is called invalidating remote control. The command accepting unit 116 invalidates remote control in response to acquisition of an invalidation command that is a command for invalidating remote control. The command accepting unit 116 validates remote control in response to acquisition of a validation command that is a command for validating remote control. In the present embodiment, the invalidation command is supplied from the remote controller 200 via the communication device 130. The validation command is supplied from the switcher TL via the connector 140. In the valid state, the remote control command is supplied from the command accepting unit 116 to the vehicle control unit 115. In the invalid state, the remote control command is not supplied from the command accepting unit 116 to the vehicle control unit 115. Specifically, while the vehicle 100 is allowed to run by remote control implemented from outside in the valid state, the vehicle 100 is not allowed to run by remote control implemented from outside in the invalid state.

The information acquiring unit 117 acquires information to be used for judging whether validating remote control over the vehicle 100 is proper, and transmits the acquired information to the remote controller 200. In the present embodiment, the information acquiring unit 117 acquires information indicating whether a start switch of the vehicle 100 is on or off, identification information about the switcher TL connected to the connector 140, location information indicating a current location of the vehicle 100 acquired from the GSNN receiver 150, and an image acquired from the in-vehicle camera 160. The start switch corresponds to an ignition switch of a gasoline vehicle. The off state of the start switch disables self-running of the vehicle 100.

As shown in FIG. 1, the remote controller 200 is configured using a computer including a processor 201, a memory 202, an input/output interface 203, and an internal bus 204. The processor 201, the memory 202, and the input/output interface 203 are connected to each other via the internal bus 204 in a manner allowing bidirectional communication therebetween. A communication device 205 for communicating with the vehicle 100 and the management device 300 via radio communication is connected to the input/output interface 203. The communication device 205 may communicate with the vehicle 100 via radio communication and may communicate with the management device 300 via wire communication. The communication device 205 is capable of communicating with a camera CM described later via wire communication or radio communication. The memory 202 stores a computer program PG2 and a database DB. The communication device 205 may be called a second communication unit.

The processor 201 executes the computer program PG2 to function as a remote control unit 210 and a judging unit 220. The remote control unit 210 generates a remote control command for controlling the vehicle 100 remotely, and supplies the remote control command to the vehicle 100. The judging unit 220 judges whether validating remote control over the vehicle 100 is proper.

The database DB contains identification information about a device permitted to be used for validating remote control over the vehicle 100, identification information about a person permitted to validate remote control over the vehicle 100, and information indicating a range of a geofenced region in which validating remote control over the vehicle 100 is permitted. The device permitted to be used for validating remote control includes the switcher TL manufactured by a manufacturer of the vehicle 100, for example. The person permitted to validate remote control includes an employee at the manufacturer of the vehicle 100 and an employee at a dealership of the vehicle 100, for example. The geofenced region is a region surrounded by a geofence as a virtual fence. The geofenced region is defined to cover a particular facility or a particular area.

The management device 300 is a device for managing the remote control system 10. The management device 300 is a desktop personal computer, for example. The management device 300 may be a tablet terminal. The management device 300 is operated by an administrator of the remote control system 10. The management device 300 includes a communication device (not shown in the drawings) for communicating with the remote controller 200 via wire communication or radio communication, and an announcing unit 310 for announcing abnormality having occurred at the remote control system 10 to the administrator. In the present embodiment, the announcing unit 310 is a display and announces the abnormality in a text message, for example. The announcing unit 310 may be a speaker to announce the abnormality by sound or a lamp to announce the abnormality by light.

Figure 3:
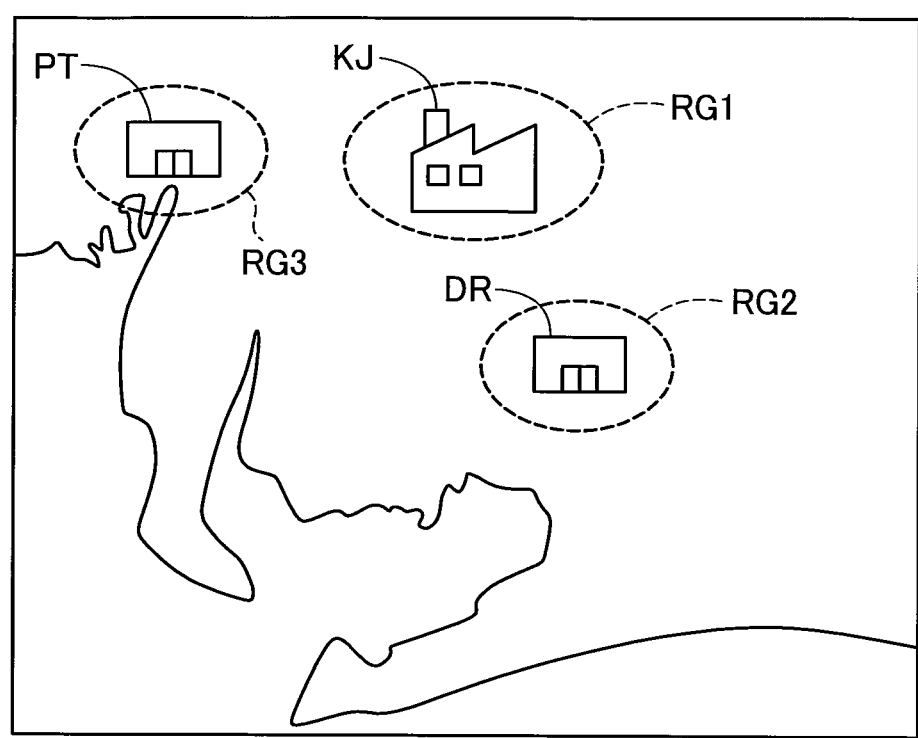
FIG. 3 is an explanatory view showing a geofenced region.

FIG. 3 is an explanatory view showing a geofenced region RG. FIG. 3 shows three geofenced regions RG1 to RG3. The geofenced region RG1 is defined to cover a factory KJ where the vehicle 100 is manufactured. The geofenced region RG2 is defined to cover a dealership DR where the vehicle 100 is sold. The geofenced region RG3 is defined to cover a port PT where the vehicle 100 is shipped. In the following, when the geofenced regions RG1 to RG3 will be described without being distinguished from each other particularly, the geofenced regions RG1 to RG3 will be called a geofenced region RG simply.

Figure 4A:
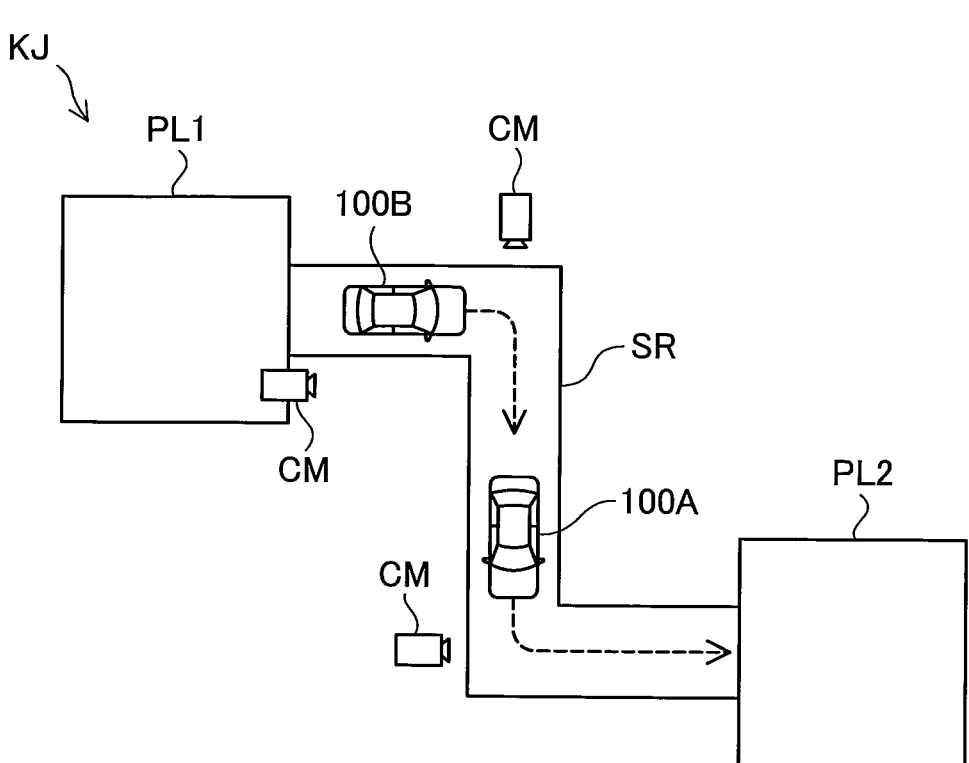
FIG. 4A is an explanatory view showing a situation where the vehicle runs by remote control.

FIG. 4A is an explanatory view showing a situation where the vehicle 100 runs by remote control. FIG. 4A shows a situation where two vehicles 100A and 100B run in the factory KJ. In the following, when the vehicles 100A and 100B will be described without being distinguished from each other particularly, the vehicles 100A and 100B will be called the vehicle 100 simply. In the present embodiment, the factory KJ includes a first place PL1 for implementation of assembly work of the vehicle 100, and a second place PL2 for implementation of inspection on the vehicle 100. The first place PL1 and the second place PL2 are connected to each other through a track SR allowing the vehicle 100 to run therethrough. After the vehicle 100 is assembled at the first place PL1, the vehicle 100 is subjected to the inspection at the second place PL2. The vehicle 100 having passed the inspection at the second place PL2 is shipped from the factory KJ.

When the assembly work at the first place PL1 is finished, the vehicle 100 is brought to a state movable by remote control. The state of the vehicle 100 movable by remote control means a state where the vehicle 100 includes the vehicle controller 110, the actuator group 120 and the communication device 130, and is capable of fulfilling three functions including "run," "turn," and "stop" by remote control. For this reason, at a moment when the vehicle 100 is to move by remote control, the vehicle 100 does not have to be equipped with at least some of interior components such as a driver's seat and a dashboard, does not have to be equipped with at least some of exterior components such as a bumper and a fender, or does not have to be equipped with a bodyshell. In such cases, a remaining component such as a bodyshell may be mounted on the vehicle 100 before the vehicle 100 is shipped from the factory KJ, or a remaining component such as a bodyshell may be mounted on the vehicle 100 after the vehicle 100 is shipped from the factory KJ.

The places PL1 and PL2 may be provided in the same building or in different buildings at the same site. The places PL1 and PL2 may be provided outdoors, not indoors. The places PL1 and PL2 may be provided separately at a plurality of sites. For example, the places PL1 and PL2 may be provided separately at a first factory and a second factory next to each other across a public road or a private road. In this case, the first factory and second factory are called the factory KJ collectively, and the track SR may include a part of the public road or a part of the private road.

The following describes a method by which the remote control unit 210 causes the vehicle 100 to run by remote control while referring to a case where the vehicle 100 runs from the first place PL1 to the second place PL2 as an example. The remote control unit 210 determines a target route along which the vehicle 100 is to run to a destination through the track SR. In the present embodiment, the target route corresponds to a reference route described later. The factory KJ is equipped with a plurality of cameras CM for capturing images of the track SR. The remote control unit 210 is capable of acquiring the location and position of the vehicle 100 relative to the target route in real time by analyzing images captured by the cameras CM. The remote control unit 210 generates a remote control command for causing the vehicle 100 to run along the target route, and transmits the remote control command to the vehicle 100. In the present embodiment, the remote control command corresponds to a running control signal described later. The vehicle controller 110 mounted on the vehicle 100 controls the actuator group 120 in response to the received remote control command, thereby causing the vehicle 100 to run. This allows the remote control system 10 to move the vehicle 100 from the first place PL1 to the second place PL2 by remote control without using a conveyance device such as a crane or a conveyor. In the present embodiment, the remote control unit 210 allows the plurality of vehicles 100A and 100B to run simultaneously in parallel with each other by remote control.

In the present embodiment, after the vehicle 100 moves to the second place PL2, remote control over the vehicle 100 is invalidated. It is possible to validate remote control over the vehicle 100 thereafter. If remote control over the vehicle 100 having been conveyed to the dealership DR from the factory KJ is validated, for example, it is possible to move the vehicle 100 by remote control without driving of the vehicle 100 by a worker at the dealership DR. In another case, if remote control over the vehicle 100 having been conveyed to the port PT from the factory KJ is validated, it is possible to ship the vehicle 100 by remote control without driving of the vehicle 100 by a worker at the port PT.

FIG. 4B is a flowchart showing a processing procedure for running control of the vehicle 100 in the first embodiment. In step S1, the remote control unit 210 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory KJ. In the present embodiment, the reference coordinate system of the factory KJ is a global coordinate system and a location in the factory KJ can be expressed by X, Y, and Z coordinates in the global coordinate system. In the present embodiment, the external sensor is a camera CM that is disposed in the factory KJ and outputs a captured image as detection result. In step S1, the remote control unit 210 acquires the vehicle location information using the captured image acquired from the camera CM as the external sensor.

More specifically, in step S1, the remote control unit 210 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the remote control system 10 or outside the remote control system 10.

The detection model is stored in advance in a memory 202 of the remote control device 200, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The remote control unit 210 can acquire the orientation of the vehicle 100 through estimation based on the direction of a motion vector of the vehicle 100 detected from change in location of a feature point of the vehicle 100 between frames of the captured images using optical flow process, for example.

In step S2, the remote control unit 210 determines a target location to which the vehicle 100 is to move next. In the present embodiment, the target location is expressed by X, Y, and Z coordinates in the global coordinate system. The memory 202 of the remote control device 200 contains a reference route stored in advance as a route along which the vehicle 100 is to run. The route is expressed by a node indicating a departure place, a node indicating a way point, a node indicating a destination, and a link connecting nodes to each other. The remote control unit 210 determines the target location to which the vehicle 100 is to move next using the vehicle location information and the reference route. The remote control unit 210 determines the target location on the reference route ahead of a current location of the vehicle 100.

In step S3, the remote control unit 210 generates a running control signal for causing the vehicle 100 to run toward the determined target location. In the present embodiment, the running control signal includes an acceleration and a steering angle of the vehicle 100 as parameters. The remote control unit 210 calculates a running speed of the vehicle 100 from transition of the location of the vehicle 100 and makes comparison between the calculated running speed and a target speed of the vehicle 100 determined in advance. If the running speed is lower than the target speed, the remote control unit 210 generally determines an acceleration in such a manner as to accelerate the vehicle 100. If the running speed is higher than the target speed as, the remote control unit 210 generally determines an acceleration in such a manner as to decelerate the vehicle 100. If the vehicle 100 is on the reference route, remote control unit 210 determines a steering angle and an acceleration in such a manner as to prevent the vehicle 100 from deviating from the reference route. If the vehicle 100 is not on the reference route, in other words, if the vehicle 100 deviates from the reference route, the remote control unit 210 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the remote control unit 210 transmits the generated running control signal to the vehicle 100. The remote control unit 210 repeats the acquisition of vehicle location information, the determination of a target location, the generation of a running control signal, the transmission of the running control signal, and others in a predetermined cycle.

In step S5, the vehicle control unit 115 of the vehicle 100 receives the running control signal transmitted from the remote control device 200. In step S6, the vehicle control unit 115 controls the actuator group 120 of the vehicle 100 using the received running control signal, thereby causing the vehicle 100 to run at the acceleration and the steering angle indicated by the running control signal. The vehicle control unit 115 repeats the reception of a running control signal and the control over the actuator group 120 in a predetermined cycle.

Figure 5:
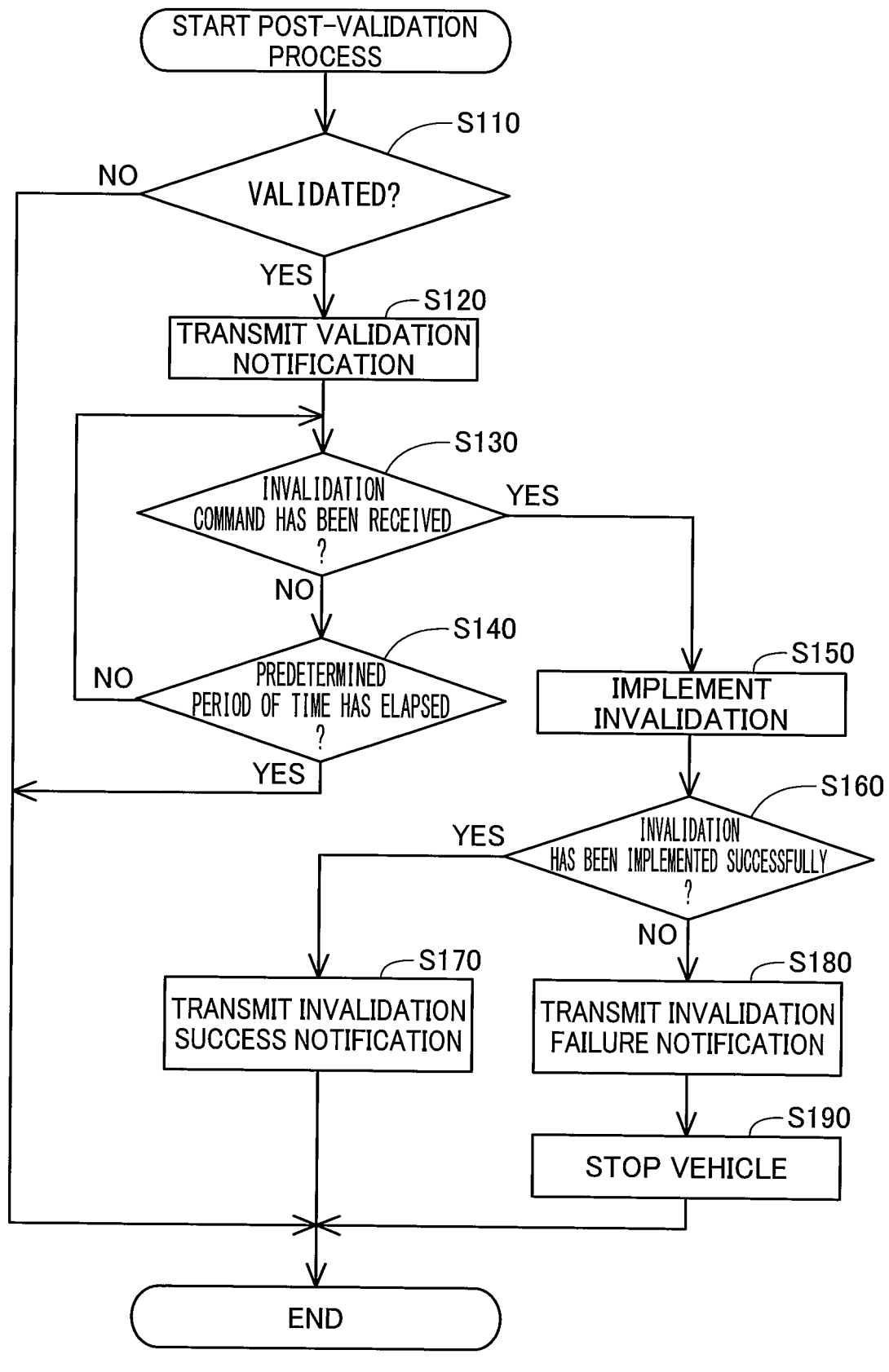
FIG. 5 is a flowchart showing details of a post-validation process.
Figure 6:
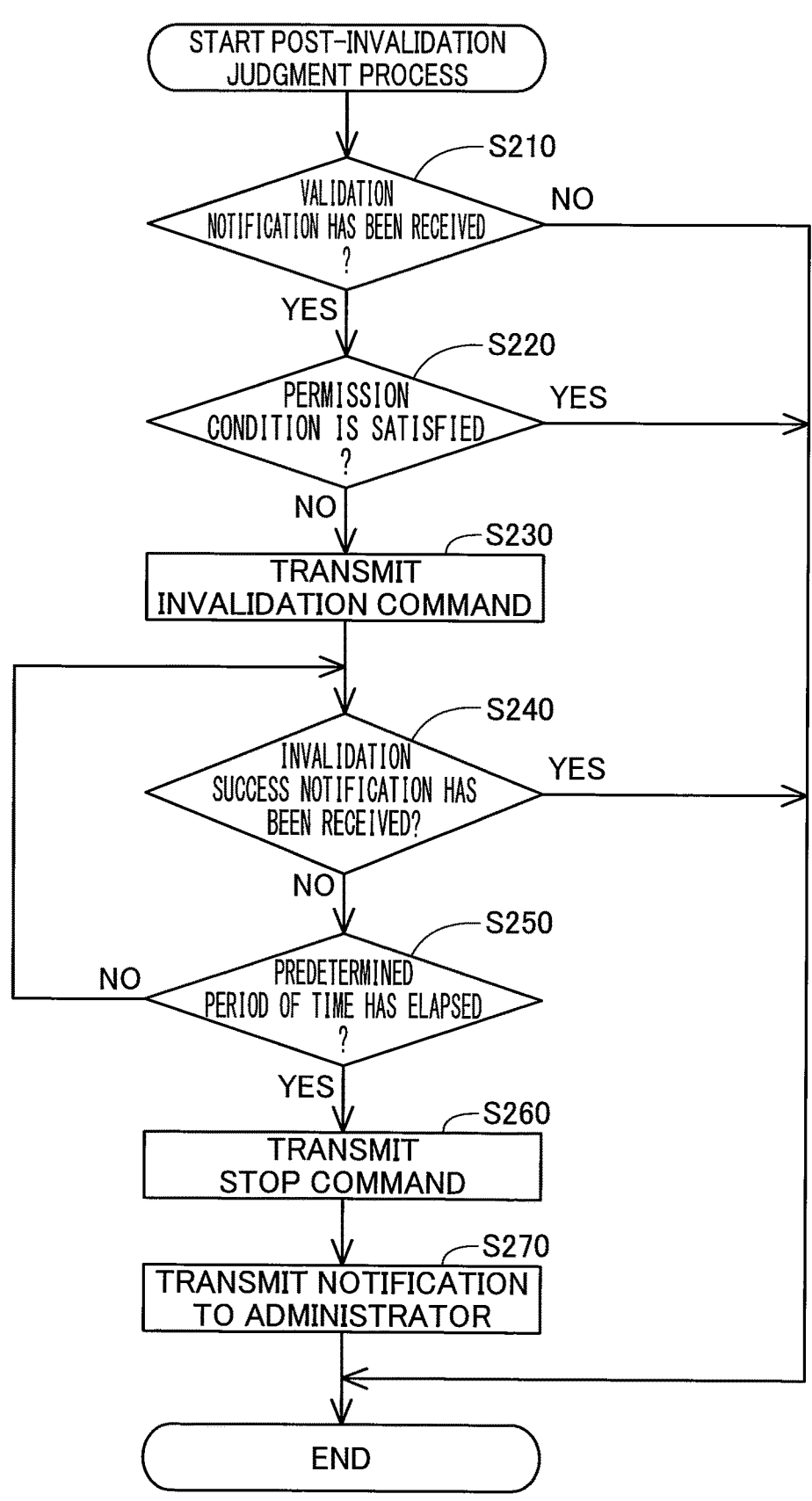
FIG. 6 is a flowchart showing details of a post-validation judgment process.

FIG. 5 is a flowchart showing details of a post-validation process performed by the vehicle 100. FIG. 6 is a flowchart showing details of a post-validation judgment process performed by the remote controller 200. A method described next using FIGS. 5 and 6 is implemented by the remote control system 10 if remote control over the vehicle 100 is validated. The method implemented by the remote control system 10 may be called a remote control method.

The post-validation process shown in FIG. 5 is performed repeatedly by the vehicle controller 110 of the vehicle 100. When the post-validation process is started, the command accepting unit 116 judges in step S110 whether remote control over the vehicle 100 has been validated. If it is not judged in step S110 that remote control over the vehicle 100 has been validated, the command accepting unit 116 skips steps after step S110 to finish the post-validation process. If it is judged in step S110 that remote control over the vehicle 100 has been validated, the command accepting unit 116 transmits a validation notification to the remote controller 200 via the communication device 130 in step S120. The validation notification is a notification indicating that remote control has been validated. The validation notification may be called second information.

In step S130, the command accepting unit 116 judges whether an invalidation command has been received from the remote controller 200. If it is not judged in step S130 that the invalidation command has been received from the remote controller 200, the command accepting unit 116 judges in step S140 whether a predetermined period of time has elapsed since transmission of the validation notification. If it is not judged in step S140 that the predetermined period of time has elapsed since transmission of the validation notification, the command accepting unit 116 returns to step S130 to judge again whether the invalidation command has been received from the remote controller 200. If it is judged in step S140 that the predetermined period of time has elapsed since transmission of the validation notification, the command accepting unit 116 finishes the post-validation process.

If it is judged in step S130 that the invalidation command has been received from the remote controller 200, the command accepting unit 116 implements invalidation of remote control over the vehicle 100 in step S150. In step S160, the command accepting unit 116 judges whether invalidation of remote control over the vehicle 100 has been implemented successfully. If it is judged in step S160 that invalidation of remote control over the vehicle 100 has been implemented successfully, the command accepting unit 116 transmits an invalidation success notification to the remote controller 200 in step S170. The invalidation success notification is a notification indicating that invalidation has been implemented successfully. Then, the vehicle controller 110 finishes the post-validation process.

If it is not judged in step S160 that invalidation of remote control over the vehicle 100 has been implemented successfully, the command accepting unit 116 transmits an invalidation failure notification to the remote controller 200 in step S180. The invalidation failure notification is a notification indicating that invalidation ends in failure. In step S190, the vehicle control unit 115 turns off the start switch of the vehicle 100 to stop the vehicle 100. In the present embodiment, the vehicle control unit 115 turns off the start switch of the vehicle 100 in response to a stop command received from the remote controller 200 via the communication device 130. Then, the vehicle controller 110 finishes the post-validation process.

The post-validation judgment process shown in FIG. 6 is performed repeatedly by the remote controller 200. When the post-validation judgment process is started, the judging unit 220 judges in step S210 whether a validation notification has been received from the vehicle 100 via the communication device 205. If it is not judged in step S210 that the validation notification has been received from the vehicle 100, the judging unit 220 skips steps after step S210 to finish the post-validation judgment process.

If it is judged in step S210 that the validation notification has been received from the vehicle 100, the judging unit 220 judges in step S220 whether a predetermined permission condition is satisfied. In the present embodiment, the judging unit 220 judges that the permission condition is satisfied if at least one of conditions A to D mentioned below is satisfied.

Condition A: A condition to be satisfied if validation of remote control was implemented with the start switch of the vehicle 100 in an off state.

Condition B: A condition to be satisfied if validation of remote control was implemented by the switcher TL registered with the database DB.

Condition C: A condition to be satisfied if validation of remote control was implemented by the worker WK registered with the database DB.

Condition D: A condition to be satisfied if validation of remote control was implemented in the geofenced region RG registered with the database DB.

The permission condition may be a condition to be satisfied if any one of the conditions A to D is satisfied, a condition to be satisfied if two or more of the conditions A to D are satisfied, a condition to be satisfied if three or more of the conditions A to D are satisfied, or a condition to be satisfied if all the conditions A to D are satisfied.

Regarding the condition A, in the present embodiment, the judging unit 220 acquires information indicating whether the start switch is on or off at the time of implementation of validation together with a validation notification from the vehicle 100. If the condition A is included in the permission condition, it is possible to improve safety while remote control over the vehicle 100 is validated.

Regarding the condition B, in the present embodiment, the switcher TL transmits identification information about the switcher TL together with a validation command to the vehicle 100 via the connector 140. The judging unit 220 acquires the identification information about the switcher TL together with the validation notification from the vehicle 100. The judging unit 220 judges whether the switcher TL having been used for the validation is registered with the database DB. If the condition B is included in the permission condition, it is possible to reduce a likelihood that remote control over the vehicle 100 will be validated by the unpermitted switcher TL.

Regarding the condition C, in the present embodiment, the in-vehicle camera 160 captures an image of the face of the worker WK who is connecting the switcher TL to the connector 140. The judging unit 220 acquires the image of the worker WK captured by the in-vehicle camera 160 together with a validation notification. The judging unit 220 judges through face authentication using the image whether the worker WK in the image is a person registered with the database DB. If the condition C is included in the permission condition, it is possible to reduce a likelihood that remote control over the vehicle 100 will be validated by an unpermitted person.

Regarding the condition D, in the present embodiment, the judging unit 220 acquires location information about the vehicle 100 obtained from the GSNN receiver 150 together with a validation notification. The judging unit 220 judges whether the location information about the vehicle 100 is in the geofenced region RG registered with the database DB. If the condition D is included in the permission condition, it is possible to reduce a likelihood that remote control over the vehicle 100 will be validated at an unpermitted place.

If it is judged in step S220 that the permission condition is satisfied, the judging unit 220 skips steps after step S220 to finish the post-validation judgment process. Specifically, if it is judged in step S220 that the permission condition is satisfied, the judging unit 220 finishes the post-validation judgment process without taking any step. If it is judged in step S220 that the permission condition is satisfied, the judging unit 220 may transmit a notification indicating that validation of remote control is permissible to the vehicle 100.

If it is not judged in step S220 that the permission condition is satisfied, the judging unit 220 transmits an invalidation command to the vehicle 100 in step S230. In step S240, the judging unit 220 judges whether an invalidation success notification has been received from the vehicle 100. If it is judged in step S240 that the invalidation success notification has been received from the vehicle 100, the judging unit 220 skips steps after step S240 to finish the post-validation judgment process.

If it is not judged in step S240 that the invalidation success notification has been received from the vehicle 100, the judging unit 220 judges in step S250 whether a predetermined period of time has elapsed since transmission of the invalidation command. If it is not judged in step S250 that the predetermined period of time has elapsed, the judging unit 220 returns to step S240 to judge whether the invalidation success notification has been received. If it is judged in step S250 that the predetermined period of time has elapsed, the judging unit 220 transmits a stop command that is a command for turning off the start switch to the vehicle 100 in step S260. In step S270, the judging unit 220 transmits a notification indicating failure in invalidating remote control over the vehicle 100 to the management device 300. The management device 300 makes an announcement indicating the failure in invalidating remote control over the vehicle 100 to an administrator via the announcing unit 310. Then, the judging unit 220 finishes the post-validation judgment process.

Figure 7:
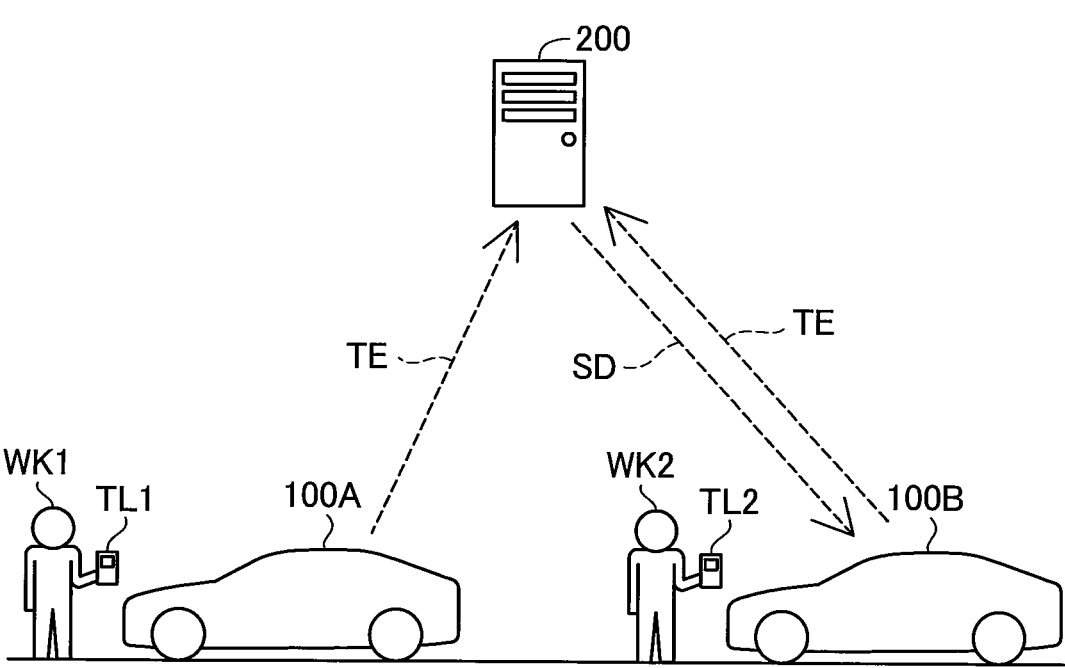
FIG. 7 is an explanatory view showing a situation where remote control over the vehicle is set again from validation to invalidation.

FIG. 7 is an explanatory view showing a situation where remote control over the vehicle 100 is set again from validation to invalidation. FIG. 7 shows two vehicles 100A and 100B. In the illustration in FIG. 7, the permission condition is a condition to be satisfied if validation of remote control is implemented by the switcher TL registered with the database DB (condition B). In FIG. 7, while a switcher TL1 is the switcher TL registered with the database DB, a switcher TL2 is the switcher TL not registered with the database DB. If a worker WK1 validates remote control over the vehicle 100A using the switcher TL1, identification information about the switcher TL1 is transmitted together with a validation notification TE from the vehicle 100A to the remote controller 200. As the identification information about the switcher TL1 is registered with the database DB, in other words, as the validation of remote control over the vehicle 100A satisfies the permission condition, an invalidation command is not transmitted from the remote controller 200 to the vehicle 100A. By contrast, if a worker WK2 validates remote control over the vehicle 100B using the switcher TL2, identification information about the switcher TL2 is transmitted together with a validation notification TE from the vehicle 100B to the remote controller 200. As the identification information about the switcher TL2 is not registered with the database DB, in other words, as the validation of remote control over the vehicle 100B does not satisfy the permission condition, an invalidation command SD is transmitted from the remote controller 200 to the vehicle 100B to set remote control over the vehicle 100B again from validation to invalidation. If remote control over the vehicle 100B is not set again from validation to invalidation due to communication error, for example, a notification is transmitted from the remote controller 200 to the management device 300. In response to receipt of the notification from the remote controller 200, the management device 300 operates the announcing unit 310 to make an announcement to an administrator indicating that the abnormality has occurred. This allows the administrator to see that remote control over the vehicle 100B has not be set again from validation to invalidation.

According to the remote control system 10 of the present embodiment described above, if remote control over the vehicle 100 is validated, a validation notification is transmitted from the vehicle 100 to the remote controller 200. If the judging unit 220 of the remote controller 200 judges that the validation notification has been received and the permission condition is satisfied, the judging unit 220 permits the validation of remote control over the vehicle 100. If the judging unit 220 judges that the validation notification has been received and the permission condition is not satisfied, the judging unit 220 transmits an invalidation command to the vehicle 100. Thus, it is possible to reduce a likelihood that remote control over the vehicle 100 will be implemented in an improper situation.

In the present embodiment, if remote control over the vehicle 100 is not invalidated despite transmission of an invalidation command, the judging unit 220 transmits a stop command for turning off the start switch to the vehicle 100. Thus, it is possible to reduce a likelihood that remote control over the vehicle 100 will be implemented in an improper situation.

In the present embodiment, if remote control over the vehicle 100 is not invalidated despite transmission of an invalidation command, the judging unit 220 transmits a notification to the management device 300 to make an announcement using the announcing unit 310. Thus, it is possible to reduce a likelihood that remote control over the vehicle 100 will be implemented in an improper situation.

B. Second Embodiment

Figure 8:
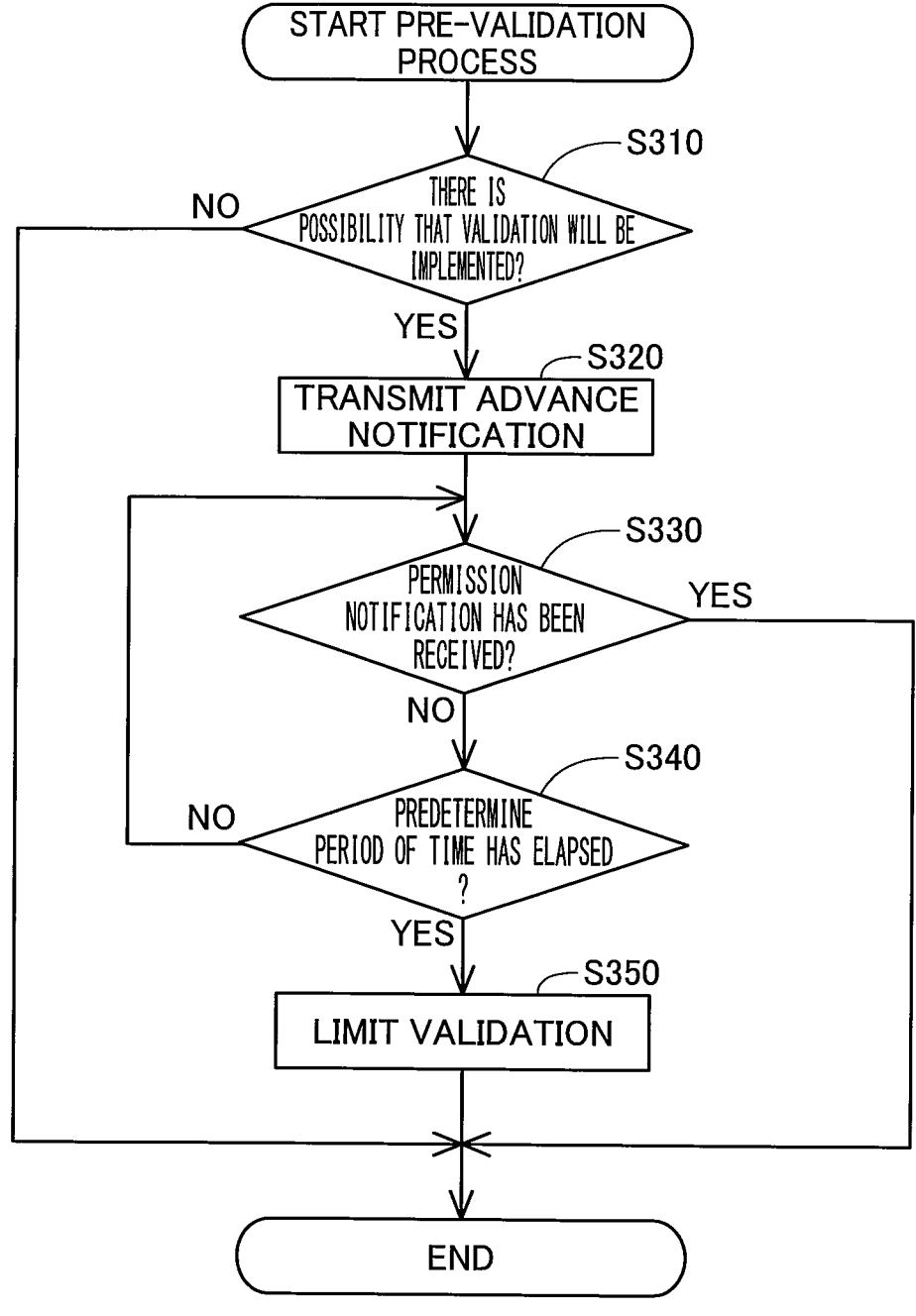
FIG. 8 is a flowchart showing details of a pre-validation process.
Figure 9:
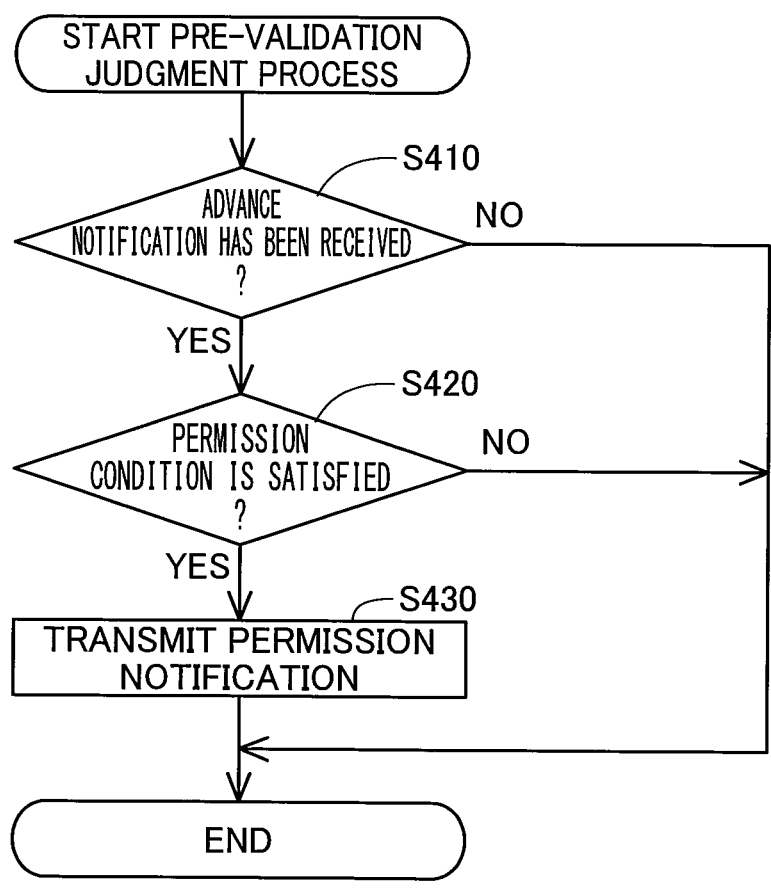
FIG. 9 is a flowchart showing details of a pre-validation judgment process.

FIG. 8 is a flowchart showing details of a pre-validation process performed by a remote control system 10b of a second embodiment. FIG. 9 is a flowchart showing details of a pre-validation judgment process performed by the remote control system 10*b*. The second embodiment differs from the first embodiment in that the remote control system 10*b* performs the pre-validation process shown in FIG. 8 and the pre-validation judgment process shown in FIG. 9 prior to validation of remote control over the vehicle 100. Unless specifically stated otherwise, the configuration of the second embodiment is the same as that of the first embodiment.

The pre-validation process shown in FIG. 8 is performed repeatedly by the vehicle controller 110 of the vehicle 100 while remote control over the vehicle 100 is invalid. When the pre-validation process is started, the command accepting unit 116 judges in step S310 whether there is a possibility that remote control over the vehicle 100 will be validated. In the present embodiment, the command accepting unit 116 judges that there is a possibility that remote control over the vehicle 100 will be validated if operation defined in advance is detected. In the present embodiment, the command accepting unit 116 judges that there is a possibility that remote control over the vehicle 100 will be validated if the switcher TL is connected to the connector 140. In a configuration where the connector 140 is provided with a cover, the command accepting unit 116 may judge that there is a possibility that remote control over the vehicle 100 will be validated if the cover is removed from the connector 140. The command accepting unit 116 may judge that there is a possibility that remote control over the vehicle 100 will be validated if it is determined from the in-vehicle camera 160 that the worker WK is about to perform operation of validating remote control.

If it is not judged in step S310 that there is a possibility that remote control over the vehicle 100 will be validated, the command accepting unit 116 skips steps after step S310 to finish the pre-validation process. If it is judged in step S310 that there is a possibility that remote control over the vehicle 100 will be validated, the command accepting unit 116 transmits an advance notification to the remote controller 200 in step S320 indicating that there is a possibility that remote control over the vehicle 100 will be validated. The advance notification may be called first information.

In step S330, it is judged whether a permission notification has been received from the remote controller 200. The permission notification is a notification indicating permission of validation of remote control. If it is judged in step S330 that the permission notification has been received from the remote controller 200, the command accepting unit 116 finishes the pre-validation process. If it is not judged in step S330 that the permission notification has been received from the remote controller 200, the command accepting unit 116 judges in step S340 whether a predetermined period of time has elapsed since transmission of the advance notification. If it is not judged in step S340 that the predetermined period of time has elapsed since transmission of the advance notification, the command accepting unit 116 returns to step S330 to judge whether the permission notification has been received from the remote controller 200. If it is judged in step S340 that the predetermined period of time has elapsed since transmission of the advance notification, the command accepting unit 116 limits validation of remote control over the vehicle 100 in step S350. The command accepting unit 116 limits validation of remote control over the vehicle 100 by rejecting acceptance of a validation command for a certain period of time, for example. Then, the command accepting unit 116 finishes the pre-validation process.

The pre-validation judgment process shown in FIG. 9 is performed repeatedly by the remote controller 200 while remote control over the vehicle 100 is in an invalid state. When the pre-validation judgment process is started, the judging unit 220 judges in step S410 whether an advance notification has been received from the vehicle 100. If it is not judged in step S410 that the advance notification has been received from the vehicle 100, the judging unit 220 skips steps after step S410 to finish the pre-validation judgment process.

If it is judged in step S410 that the advance notification has been received from the vehicle 100, the judging unit 220 judges in step S420 whether a permission condition is satisfied. In the present embodiment, the judging unit 220 judges that the permission condition is satisfied if at least one of conditions E to H mentioned below is satisfied.

Condition E: A condition to be satisfied if the start switch of the vehicle 100 is off.

Condition F: A condition to be satisfied if validation of remote control will be implemented using the switcher TL registered with the database DB.

Condition G: A condition to be satisfied if validation of remote control will be implemented by the worker WK registered with the database DB.

Condition H: A condition to be satisfied if validation of remote control will be implemented in the geofenced region RG registered with the database DB.

The permission condition may be a condition to be satisfied if any one of the conditions E to H is satisfied, a condition to be satisfied if two or more of the conditions E to H are satisfied, a condition to be satisfied if three or more of the conditions E to H are satisfied, or a condition to be satisfied if all the conditions E to H are satisfied.

If it is not judged in step S420 that the permission condition is satisfied, the judging unit 220 finishes the pre-validation judgment process. If it is judged in step S420 that the permission condition is satisfied, the judging unit 220 transmits a permission notification to the vehicle 100 in step S430. Then, the judging unit 220 finishes the pre-validation judgment process.

According to the remote control system 10*b* of the present embodiment described above, if it is judged that the predetermined period of time has elapsed since transmission of the advance notification while the permission notification is unreceived, the command accepting unit 116 limits validation of remote control over the vehicle 100. Thus, compared to the first embodiment, it is possible to reduce a likelihood more reliably that remote control over a moving object will be implemented in an improper situation.

C. Other Embodiments (C1) In each of the remote control systems 10 and 10*b* of the embodiments described above, the vehicle 100 includes the connector 140 to which the switcher TL is to be connected. Meanwhile, the connector 140 is omissible from the vehicle 100. In this case, a validation command may be supplied via radio communication from the switcher TL.

(C2) In each of the remote control systems 10 and 10*b* of the embodiments described above, the vehicle 100 includes the GSNN receiver 150. Meanwhile, if the above-described conditions D and H are not included in the permission condition, the GSNN receiver 150 is omissible from the vehicle 100.

(C3) In each of the remote control systems 10 and 10*b* of the embodiments described above, the vehicle 100 includes the in-vehicle camera 160. Meanwhile, if the above-described conditions C and G are not included in the permission condition, the in-vehicle camera 160 is omissible from the vehicle 100. In this case, an employee at a manufacturer of the vehicle 100 or an employee at the dealership DR of the vehicle 100 may judge whether a person performing operation of validation is a person permitted to perform the operation of validation.

(C4) In each of the remote control systems 10 and 10*b* of the embodiments described above, the judging unit 220 is provided at the remote controller 200. Meanwhile, the judging unit 220 may be provided at a computer different from the remote controller 200. In this case, the computer provided with the judging unit 220 may be called a controller.

(C5) In each of the remote control systems 10 and 10*b* of the embodiments described above, the vehicle control unit 115 turns off the start switch of the vehicle 100 in step S190 of the post-validation process in response to a stop command received from the remote controller 200 via the communication device 130. Meanwhile, the vehicle control unit 115 may be programmed to turn off the start switch of the vehicle 100 in step S190 of the post-validation process even in the absence of receipt of a stop command.

(C6) In each of the remote control systems 10 and 10*b* of the embodiments described above, the remote control unit 210 acquires the location and position of the vehicle 100 relative to the target route using the camera CM installed in the factory KJ. Meanwhile, the remote control unit 210 may acquire the location and position of the vehicle 100 relative to the target route using the GSNN receiver 150 mounted on the vehicle 100.

(C7) In each of the above-described embodiments, the first place PL1 is a place for implementation of assembly work of the vehicle 100. Meanwhile, the first place PL1 may be a place for implementation of work of adjusting an optical axis of a headlamp of the vehicle 100, a place for implementation of work of adjusting wheel alignment of the vehicle 100, or a place for implementation of inspection on the vehicle 100, for example.

(C8) In each of the above-described embodiments, the second place PL2 is a place for implementation of inspection on the vehicle 100. Meanwhile, the second place PL2 may be a place for implementation of work of adjusting the optical axis of the headlamp of the vehicle 100, a place for implementation of work of adjusting the wheel alignment of the vehicle 100, or a place for storage of the vehicle 100 before shipment, for example.

(C9) In the remote control system 10*b* of the second embodiment described above, the pre-validation process and the pre-validation judgment process are performed, and then the post-validation process and the post-validation judgment process are performed. Meanwhile, in the remote control system 10*b*, implementations of the post-validation process and the post-validation judgment process are omissible after the pre-validation process and the pre-validation judgment process are performed. Even in this case, performing the pre-validation process and the pre-validation judgment process still makes it possible to reduce a likelihood that remote control over a moving object will be implemented in an improper situation.

(D8) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 100. The remote control device 200 and the vehicle 100 may acquire the vehicle location information through template matching using the three-dimensional point cloud data as the detection result and reference point cloud data, for example.

(D9) In the above-described first embodiment, the remote control device 200 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The remote control device 200 may acquire vehicle location information, determine a target location to which the vehicle 100 is to move next, and generate a route from a current location of the vehicle 100 indicated by the acquired vehicle location information to the target location. The remote control device 200 may generate a route to the target location between the current location and a destination or generate a route to the destination. The remote control device 200 may transmit the generated route to the vehicle 100. The vehicle 100 may generate a running control signal in such a manner as to cause the vehicle 100 to run along the route received from the remote control device 200 and control an actuator using the generated running control signal.

(2) The remote control device 200 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the remote control device 200 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(D10) In the above-described first embodiment, the remote control device 200 automatically generates a running control signal to be transmitted to the vehicle 100. By contrast, the remote control device 200 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the remote control device 200 through wire communication or wireless communication, for example, and the remote control device 200 may generate a running control signal responsive to the operation on the operating device.

(D11) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from the factory KJ, or a remaining component such as a bodyshell may be mounted on the vehicle 100 after the vehicle 100 is shipped from the factory KJ while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(D12) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(D13) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:

1. A remote control system comprising:
   a moving object configured to be operatable by remote control, the moving object including a first memory configured to store first program, a first processor configured to execute the first program stored in the first memory and a first communication device, the first processor having a valid state and an invalid state as operating states, the first processor configured to be switchable between the valid state and the invalid state, the valid state being the operating state that accepts a remote control command supplied from outside the moving object, the invalid state being the operating state that rejects the remote control command, the first communication device configured to transmit at least one information of first information and second information, the first information being information indicating a sign that the operating state will be switched to the valid state, the second information being information indicating that the operating state has been switched to the valid state; and
   a controller including a second memory configured to store a second program, a second processor configured to execute the second program stored in the second memory and a second communication device, the second communication device configured to receive the at least one information, the second processor configured to judge whether a predetermined permission condition is satisfied when the second communication device has received the at least one information, wherein when the second processor judges that the second communication device has received the first information and the permission condition is satisfied, the second processor transmits a permission notification indicating permission of switching of the operating state to the valid state to the moving object, when the permission notification has not been received within a predetermined period since transmission of the first information from the first communication device, the first processor limits switching of the operating state to the valid state, and when the second processor judges that the second communication device has received the second information and the permission condition is not satisfied, the second processor transmits an invalidation command for making switching of the operating state to the invalid state to the moving object.

2. The remote control system according to claim 1, wherein when the switching of the operating state to the invalid state in response to the invalidation command is successful, the first processor transmits an invalidation success notification to the controller, the invalidation success notification is a notification indicating that invalidation has been implemented successfully, and when the second communication device has not received the invalidation success notification within a predetermined period after transmitting the invalidation command to the moving object, the second communication device transmits a stop command for limiting movement of the moving object to the moving object.

3. The remote control system according to claim 1, further comprising:

an announcing unit configured to announce that abnormality has occurred, wherein when the switching of the operating state to the invalid state in response to the invalidation command is successful, the first processor transmits an invalidation success notification to the controller, the invalidation success notification is a notification indicating that invalidation has been implemented successfully, and when the second communication device has not receive the invalidation success notification within a predetermined period after transmitting the invalidation command to the moving object, the second communication device makes the announcing unit announce that abnormality has occurred.

4. The remote control system according to claim 1, wherein the permission condition includes a condition that the moving object is stopping.

5. The remote control system according to claim 1, wherein the permission condition includes a condition that switching of the operating state to the valid state is made by a predetermined device.

6. The remote control system according to claim 1, wherein the permission condition includes a condition that switching of the operating state to the valid state is made at a predetermined place.

7. The remote control system according to claim 1, wherein the permission condition includes a condition that switching of the operating state to the valid state is made by a predetermined person.

8. A controller comprising:

a second memory configured to store a second program;

a second processor configured to execute the second program stored in the second memory; and a second communication device configured to receive at least one information of first information and second information from a moving object, the moving object configured to be operatable by remote control, the moving object including a first memory configured to store a first program, a first processor configured to execute the first program stored in the first memory and a first communication device configured to transmit the at least one information, the first processor having a valid state and an invalid state as operating states, the first processor configured to be switchable between the valid state and the invalid state, the valid state being the operating state that accepts a remote control command supplied from outside the moving object, the invalid state being the operating state that rejects the remote control command, the first information being information indicating a sign that the operating state will be switched to the valid state, the second information being information indicating that the operating state has been switched to the valid state;

wherein the second processor configured to judge whether a predetermined permission condition is satisfied when the second communication device has received the at least one information, and wherein when the second processor judges that the second communication device has received the first information and the permission condition is satisfied, the second processor transmits a permission notification indicating permission of switching of the operating state to the valid state to the moving object, when the permission notification has not been received within a predetermined period since transmission of the first information from the first communication device, the first processor limits switching of the operating state to the valid state, and when the second processor judges that the second communication device has received the second information and the permission condition is not satisfied, the second processor transmits an invalidation command for making switching of the operating state to the invalid state to the moving object.

9. A remote control method comprising:

receiving at least one information of first information and second information from a moving object, the moving object configured to be operatable by remote control, the moving object including a first memory configured to store a first program, a first processor configured to execute the first program stored in the first memory and a first communication device configured to transmit the at least one information, the first processor having a valid state and an invalid state as operating states, the first processor configured to be switchable between the valid state and the invalid state, the valid state being the operating state that accepts a remote control command supplied from outside the moving object, the invalid state being the operating state that rejects the remote control command, the first information being information indicating a sign that the operating state will be switched to the valid state, the second information being information indicating that the operating state has been switched to the valid state;

judging via a second processor whether the at least one information has been received and whether a predetermined permission condition is satisfied;

transmitting a permission notification indicating permission of switching of the operating state to the valid state to the moving object when the judging judges that the receiving has received the first information and the permission condition is satisfied, wherein when the permission notification has not been received within a predetermined period since transmission of the first information from the first communication device, the first processor limits switching of the operating state to the valid state; and transmitting an invalidation command for making switching of the operating state to the invalid state to the moving object when the judging judges that the receiving has received the second information and the permission condition is not satisfied.

* * * * *